United States Patent [19]

Kalmowitz et al.

[11] 4,386,275
[45] May 31, 1983

[54] APPARATUS AND METHOD FOR DETECTING THE PRESENCE OF A HEAT-EMITTING BODY

[75] Inventors: Sheldon Kalmowitz, Commack, N.Y.; Regis Beigel, Nashua; Eldon Sutphin, Manchester, both of N.H.; Charles McGhee, Woodside, N.Y.

[73] Assignee: Energy Electronics, Inc., Danbury, Conn.

[21] Appl. No.: 214,666

[22] Filed: Dec. 9, 1980

[51] Int. Cl.³ .............................................. G01J 1/00
[52] U.S. Cl. .................................... 250/342; 340/541
[58] Field of Search ................. 250/342; 340/541, 565

[56] References Cited

U.S. PATENT DOCUMENTS 3,120,360  2/1964  Edwards ............................. 250/342
4,107,530  8/1978  Brumfield et al. .................. 250/342

Primary Examiner—Bruce C. Anderson
Attorney, Agent, or Firm—Paul J. Sutton

[57] ABSTRACT

An apparatus and method for detecting the presence of a heat emitting body within a region provides for the mounting of a cylindrical shroud having an apertured circumference within the fields of view of an infrared sensor responsive to changes in thermal energy received as a heat emitting body enters the fields of view. The motion of the heat emitting body through the fields of view provides different levels of radiation received at the sensor thereby developing a current imbalance at the output of the sensor which is used to actuate switching circuitry for controlling an appliance which is to be actuated upon entry of a heat emitting body into the field of view of the sensor.

3 Claims, 5 Drawing Figures

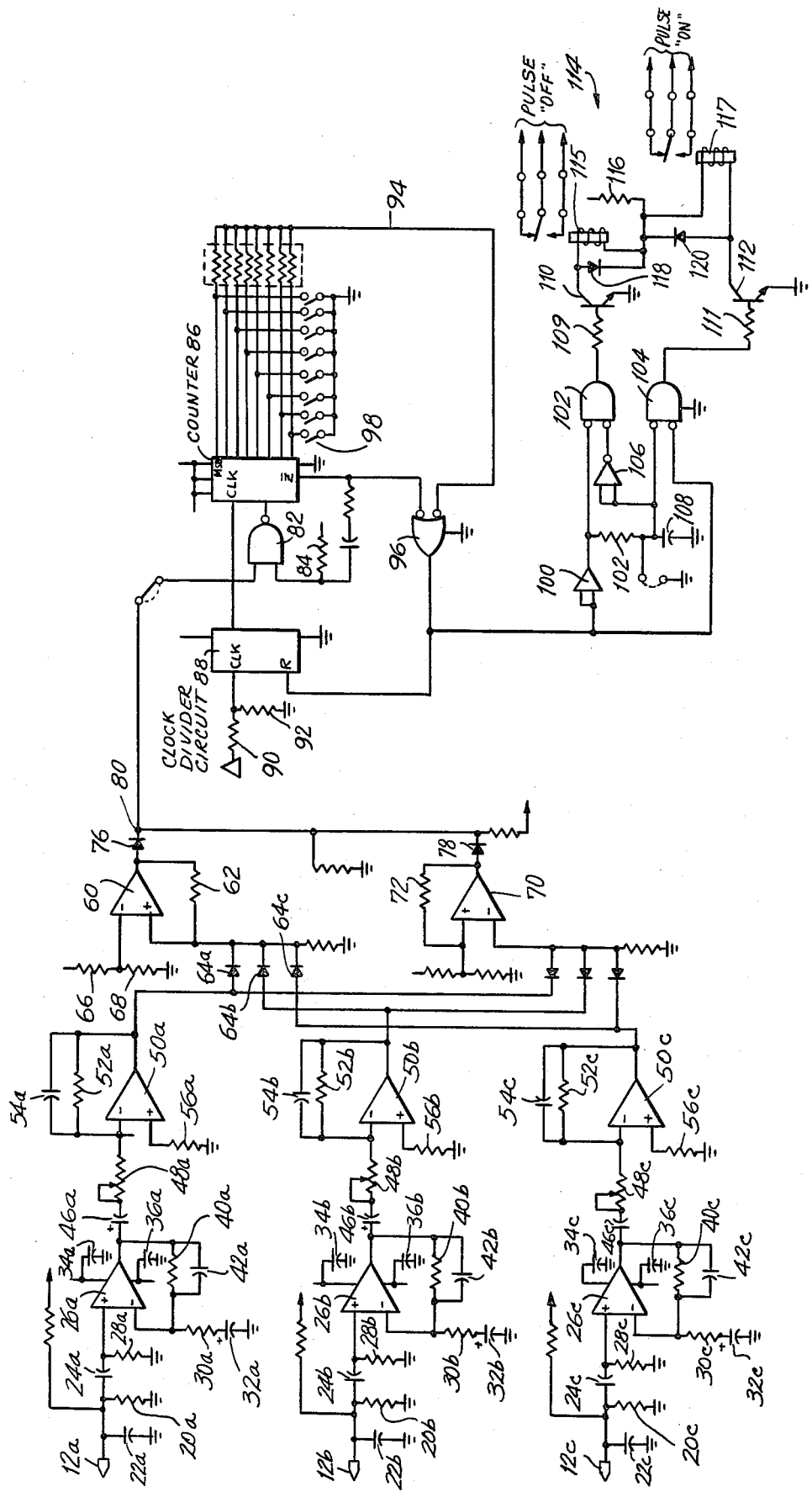

APPARATUS AND METHOD FOR DETECTING THE PRESENCE OF A HEAT-EMITTING BODY

BACKGROUND OF THE INVENTION

This invention relates to apparatus for detecting the presence of a person or persons within a room and actuating an electrically controlled appliance in response to a detected presence. More specifically, the invention relates to such apparatus which employs infrared energy sensors to turn on lights or actuate a burglar alarm or operate one or more other electrical appliances in response to a person entering a room and for deactivating lights or appliances in response to the departure of the last person from a room.

It is known in the art to detect the presence of a person in a room by sensing the change which occurs in an otherwise steady state condition in response to movement of the person within the room and to activate an appliance within the room in response to the person's entry therein and to deactivate the appliance in response to the room being empty of people. U.S. Pat. No. 3,459,961 to Ravas for a Movement Responsive Light Control Means discloses apparatus for turning on lights in a room upon entry of a person therein and for turning off the lights when the last person leaves the room. Light activation and deactivation is accomplished in response to doppler shifts in the frequency of a steady state sound wave caused by movement of the persons within the room.

It is also known to detect the entry of a person into a room by sensing thermal gradients between two regions in the room, one of which is occupied by the person whose body emits heat in the form of infrared radiation and a proximate region unoccupied by the person and out of the path of the infrared heat emissions. Infrared sensors of the latter type generally employ two infrared sensing cells which have within their respective fields of view adjacent regions within a room. Under steady state conditions with no one within the field of view of the sensors, both sensors will generally register the same temperature and have similar electrical outputs in response to the like temperatures. However, when a person enters the field of view of one sensor without entering the field of view of the other sensor, a difference in the respective electrical output signals of the sensors occurs, as for example, as a person is moving through the field of view of one cell of the sensor without having yet entered the field of view of the other cell of the sensor. Because of the relatively broad fields of view of the sensors and the fact that the fields of view must overlap in order to adequately cover a given region and insure that the same temperatures will be sensed by both sensors under steady state conditions i.e., in the absence of people) the sensors often fail to actuate the lights or other controlled appliance in a room upon entry of a person into the room for failure of the separate sensor cells to detect infrared heat emissions from the person at different times. That is, the sensors often tend to detect an increase in infrared heat emissions occasioned by the entry of a person into a room at substantially the same time so that there is no significant difference between the signal outputs of the sensor cells and, hence, there is no actuation of the controlled appliance since the controlling circuitry depends upon an imbalance in the outputs of the sensor cells.

SUMMARY OF THE INVENTION

In order to overcome the aforementioned problems of the prior art, the present invention provides a method and apparatus for detecting the presence of a heat-emitting body including a plurality of sensors mounted in a housing, each of the sensors having a field of view and being responsive to heat radiated within the field of view for producing an electrical signal dependent on the radiated heat and an enclosure mounted on the housing within the field of view of the sensors and having areas transparent to the emitted heat for permitting the heat to be radiated to the sensors and other areas which impede the heat from being radiated to the sensors whereby the field of view is divided into subfields of view so that a heat emitting body moving through the subfields causes a difference in the electrical outputs of the sensors for actuating an appliance controlling device. In a preferred embodiment of the invention, the enclosure is formed from perforated sheet material arranged in a cylindrical configuration and mounted on a housing which supports the sensors so that the circumference of the cylinder is in the field of view of the sensors.

It is therefore an object of the invention to provide a method and apparatus for detecting the presence of a heat emitting body by detecting differences in electrical signals produced in response to detection of heat emissions by two sensor cells.

Another object of the invention is to provide a method and apparatus for detecting the presence of a heat emitting body with the use of sensor cells having fields of view which are divided into subfields of view.

Still another object of the invention is to provide a method and apparatus for detecting the presence of a heat emitting body by surrounding the heat detecting sensors with a perforated cylindrical shroud.

Other and further objects of the invention will be apparent from the following drawings and description of a preferred embodiment of the invention in which like reference numerals are used to designate like parts in the various views.

DESCRIPTION OF THE DRAWINGS

FIG. 5 is a schematic diagram of the circuit of the apparatus of the preferred embodiment of the invention.

DESCRIPTION OF THE PREFERRED EMBODIMENT

Figure 1:
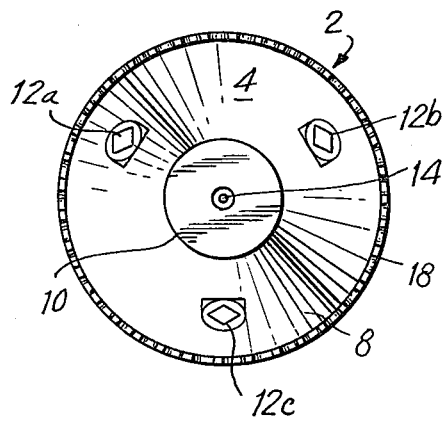
FIG. 1 is a plan view of the apparatus of the preferred embodiment of the invention.

Referring now to FIG. 1 of the drawings, there is shown an infrared radiation detection sensor 2 having a housing 4 of generally truncated frustoconical shape. The housing 4 has a narrow cylindrical portion 6 adjacent a truncated frustoconical portion 8 which tapers inwardly and is terminated at a circular surface 10.

Imbedded within the conical portion of the housing 2 and symmetrically arranged about the axis of the frustoconical housing 4 are three equiangularly displaced sensors 12a, 12b and 12c, each of which has a cylindrical can with a substantially square aperture in its circular surface forming a substantially square window facing outwardly in a direction normal to the conical surface of the housing 4 and transparent to heat emissions in the form of infrared radiation. A light emitting diode 14 is mounted in an aperture in the circular surface 10 at the truncated portion of the housing 4 and is visible along a line of sight directed to the truncated surface 10.

Figure 2:
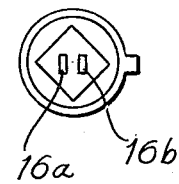
FIG. 2 is a schematic view of a sensor used in the apparatus of the preferred embodiment of the invention.

The sensors 12a, b and c each include two cells, 16a and 16b (FIG. 2), respectively, which have infrared sensing surfaces directed so that their respective fields of view overlap. Each of the cells 16a and b produce an output current in response to detection of infrared radiation received from a heat emitting body. The cells 16a and b are matched so that their current outputs under steady state conditions are balanced. However, upon entry of a heat emitting body into the fields of view associated with the cells 16a and b, a current imbalance is generated as a result of one of the cells 16a and b detecting a magnitude of infrared radiation before the other of the cells 16a and b detects the same magnitude of radiation. This current imbalance is used to generate a voltage which is amplified to signal the presence of a heat emitting body within the field of view of the respective sensor 12a, b or c which includes the field of view of the sensors 16a and b associated with the sensor. Sensors of this type are known to the art and commercially available. Examples of suitable sensors for use with the invention include a Pyroelectric IR Detector sold by Eltec Manufacturing Co. under the model designation 414 and another sold by Plessey Optoelectronics and Microwave Ltd. under the designation 5M21.

Figure 3:
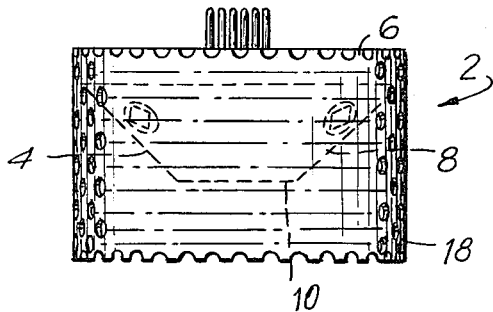
FIG. 3 is an elevation view of the apparatus of the preferred embodiment of the invention.
Figure 4:
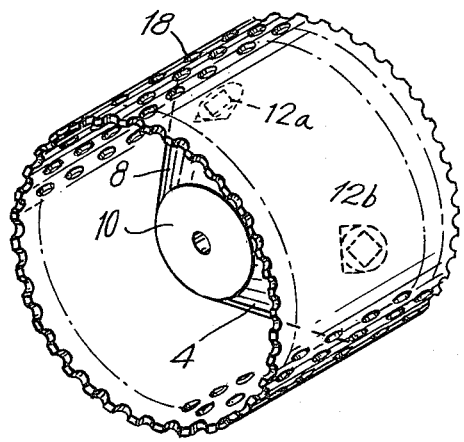
FIG. 4 is a perspective view of a part of the apparatus of the preferred embodiment of the invention.

Referring now to FIGS. 3 and 4 of the drawings, a hollow cylindrical shroud 18 is force fitted onto the cylindrical surface 6 of the housing 4 and forms an enclosure within the fields of view of the sensors 12a, 12b, and 12c. The shroud 18 has a perforated surface with uniformly distributed circular apertures. The apertures of the shroud used in the preferred embodiment of the invention are each approximately 3/32 inches in diameter and have staggered centers 5/32 inches apart. The apertures are distributed with a surface density of forty-seven (47) holes per square inch leaving thirty-three percent (33%) of the shroud surface area open and, therefore, transparent to infrared radiation. The material from which the shroud 18 is formed is preferably made of a light metal, e.g., aluminum, and is painted white for reflecting infrared radiation as well as for presenting an aesthetically pleasing appearance. The length of the shroud 18 in the axial direction is sufficient to traverse the entire fields of view of the sensors 12a, b and c but short enough so as not to unduly limit the angle of view to the diode 14 so that the diode 14 may be readily seen for indicating whether the sensor assembly has detected the presence of a heat emitting body.

The cylindrical shroud 18 is open at either end and has an inner diameter substantially equal to the outer diameter of the circumferential rim 6 of the housing 4 to enable the shroud 18 to be force fitted onto the cylindrical portion 6 of the housing 4 and there held by friction.

The circular apertures in the perforated circumference of the shroud 18 subdivide the fields of view of the sensors 12a, b and c into subfields of view passing through each of the apertures. The material of which the shroud is formed intermediate the apertures reflects the infrared radiation received from heat emitting bodies and impedes the reception of the radiation at the windows of the sensors 12a, b and c. As a result of the subdivision of the fields of view, substantially greater fluctuations take place in the currents generated by the sensors 12a, b and c as a heat emitting object moves into the field of view of the sensors thereby substantially increasing the sensitivity of the sensors to moving heat emitting objects without increasing sensitivity under static conditions. Hence, an appliance to be controlled by the sensor and actuated upon the entry of a heat emitting body into the field of view can be expected to be operated reliably and consistently upon entry of a heat emitting body into the sensor's field of view without increased incidence of false actuations, that is, actuations which take place under static conditions without entry of a heat emitting body into the field of view.

An electrical circuit which can be employed with the invention will now be described with reference to FIG. 5. The current generated at each of the sensors 12a, b and c as a result of an imbalance due to the sensing of a magnitude of infrared radiation received from a heat emitting body moving into the field of view of each respective sensor is conducted to ground through respective load detector resistors 20a, b and c. The resultant voltages across the load resistors 20a, b and c are filtered by capacitors 22a, b and c and applied through additional filtering capacitors 24a, b and c to the positive inputs of respective voltage amplifiers 26a, b and c. Biasing resistors 28a and 30a, 28b and 30b and 28c and 30c maintain the voltages at the positive and negative inputs of the respective voltage amplifiers 26a, b and c equal under static steady state conditions, i.e., the absence of entry of a heat emitting body into the fields of view of the sensors 12a, b and c, respectively, as do capacitors 32a, b and c.

Decoupling capacitors 34a and 36a, 34b and 36b and 34c and 36c are provided at the power supply inputs to the amplifiers 12a, b and c, respectively. The outputs of the amplifiers 12a, b and c, respectively, are filtered to remove high frequency signal components by an RC circuit which includes a resistor 40a, b and c, respectively, and a capacitor 42a, b and c, respectively.

The outputs of the amplifiers 26a, b and c, respectively, are connected to gain control networks including capacitors 46a, b and c, respectively, and variable resistors 48a, b and c, respectively. The gain adjusted outputs of the amplifiers 26a, b and c are then applied to the respective negative inputs of voltage amplifiers 50a, b and c having feedback resistors 52a, b and c, respectively, and feedback highpass filter capacitors 54a, b and c, respectively. Input load resistors 56a, b and c are respectively connected to the positive inputs of the amplifiers 50a, b and c.

The positive voltage outputs of the amplifiers 50a, b and c are summed at the positive input of a voltage amplifier 60 having a feedback resistor 62 by the diodes 64a, b and c which have their anodes respectively connected to the outputs of amplifiers 50a, b and c. Bias is applied to the negative input of the amplifier 60 through voltage divider resistors 66 and 68. The negative components of the output signals of the amplifiers 50a, b and c are summed at the negative input of a voltage amplifier 70 having a feedback resistor 72 as a result of application of the output voltages of the amplifiers 50a, b and c to the cathodes of diodes 74a, b and c. Bias is applied to the positive input of the amplifier 70 by voltage divider resistors 76 and 78. The amplifier 70 acts as an inverter. The outputs of the amplifiers 60 and 72, which are both positive as a result of the action of the diodes 64a, b and c and 74a, b and c, and the amplifier output diodes 76 and 78 are summed at node 80 and applied to one input of a NAND gate 82. The other input of the NAND gate 82 is positively biased through a resistor 84. The output of the NAND gate 82 is connected to a counter 86 for causing the counter to begin to count pulses applied to it from the output of a clock divider circuit 88. The pulses are derived from a 24 volt, 60 cycle AC power supply (not shown) which is connected to a voltage divider resistor 90 which cooperates with a grounded second voltage divider resistor 92 to apply pulses to the clock input of the clock divider circuit 88.

Under static conditions with no heat emitting body moving into the fields of view of the sensors 12a, b and c, the voltage at node 80 is low, thereby causing the output of the gate 82 to be normally high and preventing the counter 86 from counting. Upon occurrence of a current output from at least one of the sensors 12a, b or c resulting from the movement of a heat emitting body into the sensor's field of view, a positive voltage appears at node 80 thereby driving one input to the NAND gate 82 high. The positive voltage at node 80 is also used to apply power to the LED 14 by switching on a diode power supply (not shown). Since the other input to the NAND gate 82 is biased high through the resistor 84, the output of the NAND gate 82 goes low, thereby permitting the counter 86 to count output pulses from the clock divider circuit 88. The count which must be reached before a high signal is generated on line 94 to the input of an OR gate 96 is determined by the settings of switches 98, each of which is connected between an output of the clock counter 86 and ground. By holding each of the clock outputs at ground except for one, i.e., by closing all of the switches 98 except for one, the time which must elapse between the occurrence of a current imbalance and the appearance of a high signal on line 94 can be controlled. The switches 98 can, therefore, be used to adjust the sensitivity of the sensors.

The signal on line 94 is normally low and is inverted at its respective input to the OR gate 96 so that the output of the OR gate 96 is normally high. When the counter reaches the count programmed according to the settings of the switches 98, the output of the OR gate 96 is driven low. The output signal from the OR gate 96 is inverted in an inverter 100 and then applied to one inverting input of an AND gate 102. The output of the OR gate 96 is also applied to one inverting input of an AND gate 104. The remaining inverting input of the AND gate 102 is connected to the output of an inverter 106 which is connected to the output of inverter 100 through a resistor 107. The remaining inverting input of the AND gate 104 is also connected to the output of the inverter 100 through resistor 107. Under steady state conditions, the outputs of the AND gate 102 and the AND gate 104 are low. The normally low signal at the output of the AND gate 102 is applied to the base of a transistor 110 thereby keeping the transistor 110 normally turned off and the normally low output of the AND gate 104 is applied through a resistor 111 to the base of a transistor 112 which is also normally off.

A relay 114 has a coil 115 connected between a resistor 116 and the collector of transistor 110 and a relay 119 has a coil 117 connected between the resistor 116 and the collector of the transistor 112. Diodes 118 and 120 are connected in parallel with the coils 115 and 117, respectively, for transient suppression. The resistor 116 is connected to a positive DC potential for applying current pulses to the coil 115 when transistor 110 is momentarily rendered conducting and to coil 117 when transistor 112 is momentarily rendered conducting. Application of a current pulse to coil 115 causes the latching relay 114 to switch and be latched in an "off" state to deenergize the appliance which is being controlled by the sensor device 2. Application of a current pulse to the coil 117 causes the relay 119 to switch to the "on" state thereby energizing the appliance which is controlled by the sensor device 2.

The outputs of the AND gates 102 and 104 are momentarily held high as a result of the charging and discharging action of the RC circuit including capacitor 108 and resistor 107. This provides the pulses to momentarily turn on transistors 110 and 112 which are normally off. If it is desired to use nonlatching relays to control the appliance, capacitor 108 can be eliminated and resistor 107 can be connected directly to ground.

It will be appreciated by those skilled in the art that the logic circuitry used to control the relays 114 and 119 can also be modified to control other switching devices which can be connected in series between the appliance which is to be controlled and the power supply which energizes the appliance.

The foregoing description is of a preferred embodiment of the invention to which alterations and modifications may be made without departing from the spirit and scope of the invention which is defined in the following claims.

What is claimed is:

1. A sensor device for detecting the presence of a heat emitting body and for energizing an appliance controlled by said sensor device, in combination, comprising:

a housing having a truncated cone-shaped portion and a circular surface intersecting said housing at the truncated plane and a cylindrical portion at the base plane;

three two-cell sensors imbedded within said cone-shaped portion spaced equiangularly about the axis of said cone-shaped housing each having a window facing outwardly in a direction normal to said cone-shaped surface, one cell of each said sensor having an infrared sensing surface directed to a first field of vision overlapping the second field of vision of the other cell of each said sensor, said plurality of sensors covering a full field of view, each said sensor including means for producing an electrical signal indicative of said presence in response to a change in the amount of heat radiated within each said first and second fields of view;

a cylindrical shroud forming uniformly distributed apertures, said shroud being axially mounted on said housing at said cylindrical portion and extended along said housing beyond said circular surface, said shroud being disposed within said first and second fields of view of each sensor, and electric circuiting means associated with said device for processing the electric signals received from said first and second cells of each of said two-cell sensor device, said circuiting means for each sensor including load detector resistor means for conducting current generated at at each respective sensor as a result of an imbalance due to the sensing of a magnitude of infrared radiation received from a heat emitting body moving into said field of view of said each respective sensor to ground;

filtering capacity means for filtering resultant voltages across said load detector resistor means;

additional filtering capacitor means for receiving the filtered voltages from said filtering capacitor means and for additionally filtering said filtered voltages;

first voltage amplifier means having a positive and negative input for receiving and amplifying said filtered voltages from said additional filtering capacitor at said positive input;

biasing resistor means associated with said voltage amplifier means for maintaining the voltage at said positive and negative inputs of said voltage amplifier means equal under steady state conditions in the absence of a heat emitting body in said field of view of said each respective sensor;

decoupling capacitor means positioned at the power supply inputs to said voltage amplifier means;

resistor-capacity (RC) circuit means for filtering outputs of said voltage amplifier means to remove high frequency signal components;

gain control network means including a capacitor associated with a variable resistor for adjusting the output of said voltage amplifier, said gain control network means including a network capacitor and a variable resistor;

second voltage amplifier means having positive and negative inputs including a feedback resistor and a feedback highpass filter capacitor, said second voltage amplifier means being for receiving said output of said first voltage amplifier means via said gain control network means at said negative input;

input load resistor means connected to said positive input of said second voltage amplifier means;

said electric circuiting means further including circuiting for said three sensors combined including first summing voltage amplifier means having a positive and a negative input including three first diodes; the anode of each diode being connected to each respective said second voltage amplifier means and the cathode therefore being connected to said negative input of said first summing voltage amplifier means; a feedback resistor means positioned between said three diodes and the output of said first summing voltage amplifier means; and voltage divider means for applying bias to said negative input of said first summing voltage amplifier means; and first output diode means positioned downcurrent of said first voltage amplifier; said first summing voltage means being for summing up the positive component output signals of said three sensors;

second summing voltage amplifier means including a second voltage amplifier having a positive and a negative input; three second diodes, the cathode of each diode being connected to each respective second voltage amplifier means and the anode therefore being connected to said positive input of said first summing voltage amplifier means; a feedback resistor means positioned between said positive input and the output of said second summing voltage amplifier means; voltage divider resistor means for applying bias to said positive input of said second summing voltage amplifier means; and second output diode means positioned downcurrent of said second voltage amplifier; said second summing voltage amplifier means being for summing up the negative component signals to a positive component signal;

node means for summing said positive outputs of said first and second summing voltage amplifiers wherein a positive voltage appears at said node means when at least one of said three sensors emits a current output resulting from the movement of a heat emitting body into said at least one sensor's field of view;

NAND gate means having first and second inputs, said first input being for receiving said positive voltage appearing at said node means, said NAND gate means also including a NAND gate resistor, said second input being positively biased through said NAND gate resistor;

clock divider circuit means for applying electrical output pulses derived from a 24 volt, 60 cycle AC power supply;

counter means for counting said pulses applied from said clock divider circuit and for receiving said output pulses of said NAND gate means, said counter means also being for to begin counting said pulses upon receipt of said output of said NAND gate means, said counter means including adjustable high signal count control means for sending a high signal, which is normally a low signal;

OR gate means for receiving and inverting said signal from said counter means, wherein when said counter means reaches the count programmed according to the settings of said adjustable high signal count means, the output of said OR gate means is driven low;

first inverter means for receiving said output signal from said OR gate and for inverting said signal;

first AND gate means having a first inverter input;

second AND gate means having a second inverter input;

second inverter means positioned between said first inverter means and said first AND gate means;

resistor means positioned between said first inverter means and said second inverter means and between said first inverter means and said second AND gate means;

capacitor means connected to said resistor down current from said first inverter;

said first AND gate means being for receiving the output of said first inverter and said second invertor via said resistor;

said second AND gate means being for receiving the output of said first inverter via said resistor and the output of said OR gate;

first transistor means including a first transistor resistor, said first transistor means being for receiving the output of said first AND gate via said first transistor resistor;

second transistor means including a second transistor resistor for receiving the output of said second AND gate;

first relay means including a first coil; a first relay diode connected in parallel with said first coil for transient suppression; and a relay resistor connected to the output of said first relay diode and said first coil;

second relay means including a second coil; a second relay diode connected in parallel with said second coil for transient suppression; and said relay resistor being connected to the output of said relay diode and said second coil;

first resistor means for receiving the signal from said first AND gate and first transistor means for receiving said signal from said first resistor means, said first resistor means being for keeping said first transistor normally turned off;

second resistor means for receiving the signal from said second AND gate and second transistor means for receiving said signal from said second resistor means, said second resistor means being for keeping said second transistor normally turned off;

said relay resistor being connected to a positive DC potential for applying current pulses to said first relay coil when said first transistor means is momentarily rendered conducting and for applying current pulses to said second relay coil when said second transistor means is rendered conducting;

said first relay coil being adapted to latch said first relay means to switch and to be latched in the "off" state to de-energize said appliance which is being controlled by said sensor appliance; and said second relay coil being adapted to latch said first relay means to switch to the "on" state thereby energizing said appliance which is being controlled by said sensor appliance.

2. A sensor device according to claim 1, further including a light emitting diode mounted on said circuit surface, said shroud having an axial length sufficient to allow a field of view for said diode; a diode power supply for said diode; and said node means also being for switching on said diode power supply when a positive voltage appears at said node means when at least one of said three sensors emits a current output resulting from the movement of a heat emitting body into at least one sensor's said first and second fields of view.

3. A sensor device according to claim 1, wherein said apertures are holes each approximately 3/32 inches in diameter and have staggered centers 5/32 inches apart, said holes being distributed with a surface density of forty-seven (47) holes per square inch, said holes covering thirty-three percent of the surface of said shroud and transparent to infrared radiation.

* * * * *